US009448416B2

United States Patent
Chifu et al.

(10) Patent No.: US 9,448,416 B2
(45) Date of Patent: *Sep. 20, 2016

(54) LIGHT SOURCE DEVICE AND PROJECTION-TYPE DISPLAY DEVICE

(75) Inventors: Hiroko Chifu, Tokyo (JP); Motoyasu Utsunomiya, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 14 days.

This patent is subject to a terminal disclaimer.

(21) Appl. No.: 14/129,235

(22) PCT Filed: Jul. 13, 2011

(86) PCT No.: PCT/JP2011/065981
§ 371 (c)(1),
(2), (4) Date: Dec. 24, 2013

(87) PCT Pub. No.: WO2013/008323
PCT Pub. Date: Jan. 17, 2013

(65) Prior Publication Data
US 2014/0125956 A1 May 8, 2014

(51) Int. Cl.
*G03B 21/00* (2006.01)
*G02B 27/48* (2006.01)
*G03B 21/20* (2006.01)
(Continued)

(52) U.S. Cl.
CPC ............. *G02B 27/48* (2013.01); *F21V 13/08* (2013.01); *G02B 27/1033* (2013.01); *G03B 21/16* (2013.01); *G03B 21/204* (2013.01); *G03B 21/208* (2013.01); *G03B 21/2013* (2013.01);
(Continued)

(58) Field of Classification Search
CPC .............. G03B 21/204; G03B 21/208; G03B 21/2013; G02B 27/102; G02B 27/48
USPC ............ 353/30, 31, 37, 84, 85, 119; 362/84, 362/231, 235, 293, 294, 296.01, 297; 349/5, 7–9
See application file for complete search history.

(56) References Cited

U.S. PATENT DOCUMENTS

| 4,035,068 A | 7/1977 | Rawson |
| 8,469,520 B2 | 6/2013 | Maeda |

(Continued)

FOREIGN PATENT DOCUMENTS

| JP | 07-297111 A | 11/1995 |
| JP | H 11-064789 A | 3/1999 |

(Continued)

OTHER PUBLICATIONS

International Search Report (ISR) (PCT Form PCT/ISA/210), in PCT/JP2011/065981, dated Aug. 23, 2011.
(Continued)

*Primary Examiner* — Sultan Chowdhury
(74) *Attorney, Agent, or Firm* — McGinn IP Law Group, PLLC

(57) ABSTRACT

A light source device includes: a laser light source; a circular substrate which has fluorescent body that emits light by using light from the laser light source as excitation light; a wheel motor which rotates circular substrate; a dichroic prism which transmits the light from fluorescent body while reflecting the light from the laser light source; a diffusion plate which diffuses the light from the laser light source; and a plate spring which interconnects diffusion plate and wheel motor.

12 Claims, 11 Drawing Sheets

(51) Int. Cl.
*G03B 33/12* (2006.01)
*G02B 27/10* (2006.01)
*H04N 9/31* (2006.01)
*F21V 13/08* (2006.01)
*G03B 21/16* (2006.01)
*G02B 27/12* (2006.01)

(52) U.S. Cl.
CPC ............. *G03B 33/12* (2013.01); *H04N 9/3111* (2013.01); *H04N 9/3161* (2013.01); *G02B 27/126* (2013.01)

(56) References Cited

U.S. PATENT DOCUMENTS

| | | | |
|---|---|---|---|
| 8,833,946 | B2 | 9/2014 | Chen et al. |
| 8,979,278 | B2 | 3/2015 | Narikawa |
| 8,998,421 | B2* | 4/2015 | Akiyama et al. ............... 353/20 |
| 2003/0039036 | A1 | 2/2003 | Kruschwitz et al. |
| 2010/0245777 | A1 | 9/2010 | Ogura |
| 2010/0328627 | A1 | 12/2010 | Miyazaki |
| 2010/0328632 | A1* | 12/2010 | Kurosaki et al. ............... 353/98 |
| 2011/0013149 | A1 | 1/2011 | Utsunomiya |
| 2011/0051102 | A1 | 3/2011 | Ogura et al. |
| 2013/0010264 | A1 | 1/2013 | Takahashi et al. |
| 2013/0194552 | A1 | 8/2013 | Matsubara et al. |
| 2013/0215397 | A1 | 8/2013 | Matsubara |
| 2013/0222772 | A1 | 8/2013 | Matsubara |
| 2013/0286359 | A1 | 10/2013 | Motoya et al. |
| 2014/0028984 | A1 | 1/2014 | Osaka |
| 2014/0071182 | A1* | 3/2014 | Takahashi ............. G02B 27/10 345/690 |
| 2014/0125956 | A1 | 5/2014 | Chifu et al. |
| 2014/0139810 | A1* | 5/2014 | Matsubara ..................... 353/31 |

FOREIGN PATENT DOCUMENTS

| | | |
|---|---|---|
| JP | 2003-098476 A | 4/2003 |
| JP | 3975514 B2 | 9/2007 |
| JP | 4158987 B2 | 10/2008 |
| JP | 4303926 B2 | 7/2009 |
| JP | WO 2009/118902 A1 | 10/2009 |
| JP | 2010-237443 A | 10/2010 |
| JP | 2011-013320 A | 1/2011 |
| WO | WO 2005/008330 A1 | 1/2005 |

OTHER PUBLICATIONS

International Search Report (ISR) (PCT Form PCT/ISA/210), in PCT/JP2011/059523, dated May 17, 2011.
United States Office Action dated Nov. 6, 2015 in co-pending U.S. Appl. No. 14/112,528.

* cited by examiner

LIGHT SOURCE DEVICE AND PROJECTION-TYPE DISPLAY DEVICE

TECHNICAL FIELD

The present invention relates to a light source device that includes a fluorescent body excited by light from a laser light source, and more particularly to a light source device that includes a fluorescent plate having a fluorescent body and rotated by a motor, and a projection-type display device.

BACKGROUND ART

The projection-type display device that magnifies and displays a video is widely used from a personal theater to business presentation. As a light source for such a projection-type display device, a light source that uses an ultra high pressure mercury lamp is the mainstream. However, the light source that uses the ultra high pressure mercury lamp has problems that include short life and a significant environment effect because its uses mercury. When the ultra high pressure mercury lamp is used for the light source, an optical system becomes complex because white light from the light source is separated into lights of three primary colors, and it is difficult to be miniaturized the optical system because of the large etendue. Thus, using an ultra high pressure mercury lamp as the light source for a projection-type display that is to be miniaturized may not be the best approach.

To solve the problems, a projection-type display device that uses a semiconductor laser as a light source has been offered. Because of its high directivity, the laser light source provides advantages of high efficiency using light, low power consumption, and a long life.

Among the three primary color lights of R (red), G (green), and B (blue) used in the projection-type display device, for the red light and the blue light, high-output semiconductor lasers have been put into practical use. However, for the green light, a semiconductor laser that is durable enough to be used in display devices has not yet been developed. Thus, a SHG (Second Harmonics Generator) laser that converts infrared light (1064 nm) of a LD (laser diode) excitation solid laser or a light excitation semiconductor laser into green light (wavelength of 532 nm) by using a wavelength conversion element (SHG) has been used instead.

However, when the infrared light is converted into the green light by using the wavelength conversion element, the light source becomes larger than the semiconductor laser and photoelectric conversion efficiency is lower, causes problems in which power consumption is increased and in which stricter temperature control is needed. As a result, more restrictions are placed on the kind of light source that should be used in a compact projection-type display device.

Thus, recently, a method to obtain color light that is required has been provided by emitting light from a fluorescent body that uses light such as blue light or ultraviolet light of the semiconductor laser as excitation light.

Patent Literature 1 discloses a configuration where in a circular substrate attached to a wheel motor, a first region including a fluorescent body for emitting red light, a second region including a fluorescent body for emitting green light, and a third region for transmitting a blue laser beam are arranged in a divided manner. By rotating the wheel motor, red fluorescent light, green fluorescent light, and a blue laser beam are generated in time division to be used as light sources for a projection-display device.

The following effect is simultaneously provided: the fluorescent body is rotated by the wheel motor to disperse the energy of an excitation laser condensed on the fluorescent body, thereby preventing the fluorescent body from being thermally damaged.

Such a hybrid structure that combines a semiconductor laser and a fluorescent body is expected to be used as a light source for high-output compact projection-type display devices.

FIG. 1A is a perspective view schematically showing the general configuration example of a projection-type display device that uses a hybrid light source combining a semiconductor laser and a fluorescent body. FIG. 1B is a plan view schematically showing the general configuration example of the projection-type display device that includes the hybrid light source.

As shown in FIGS. 1A and 1B, light source device 1 included in the projection-type display device includes laser light sources 2a to 2c corresponding to respective primary color signals of R, G, and B, collimator lenses 3a to 3c, dichroic prism 4 as an optical member, circular substrate 6 coated with fluorescent body 5, wheel motor 7 for rotating circular substrate 6, optical integrator 8a for converting R, G, and B light combined by dichroic prism 4 into a rectangular light flux, spatial light modulation device 9a for modulating light from optical integrator 8a, and projection lens 10 for projecting light from spatial light modulation device 9a to a projection surface. Condenser lens 11a, mirror 12, and TIR (Total Internal Reflection) prism 13 are arranged between optical integrator 8a and spatial light modulation device 9a, and the rectangular light flux shaped by optical integrator 8a is guided to spatial light modulation device 9a.

In this case, for easier understanding, a configuration using dichroic prism 4, DMD (Digital Micromirror Device) 14 as spatial light modulation device 9a, and a pair of fly-eye lenses 15a and 15b as optical integrator 8a is described. However, a configuration using a dichroic mirror or a cross dichroic prism as an optical member, a liquid crystal panel as spatial light modulation device 9a, and a rod-type integrator or a light tunnel including a transparent medium having a rectangular section as optical integrator 8a can also be used.

Next, referring to FIG. 1B, the projection operation of the projection-type display device will be described. As shown in FIG. 1B, laser beams 16a to 16c that are emitted from laser light sources 2a to 2c respectively corresponding to the three primary color lights of R, G, and B pass through collimator lenses 3a to 3c to enlarge beam diameters, and enter into dichroic prism 4 while being converted into parallel lights.

Dichroic prism 4, which is formed into a prismatic shape, includes a plurality of optical films formed on its inner surface to transmit light from fluorescent body 5 while reflecting light of a predetermined wavelength band from each of laser light sources 2a to 2c. Among the laser beams that enter dichroic prism 4, the color laser beams (laser beams 16b and 16c in the configuration example) that are directly used as light source lights are reflected on the optical films in dichroic prism 4 to exit from the other end side of dichroic prism 4.

On the other hand, the laser beam ((laser beam 16a in the configuration example) used for exciting fluorescent body 5 is similarly reflected on the optical film in dichroic prism 4 to be applied to circular substrate 6 coated with fluorescent body 5. At this time, fluorescent body 5 is excited by laser beam 16a while being rotated by wheel motor 7 to emit fluorescent light 17. Fluorescent light 17 enters into dichroic prism 4 again. Fluorescent light 17 exits from the other end side of dichroic prism 4 together with other laser beams 16b and 16c. At this time, laser beams 16b and 16c and fluorescent light 17 are combined to enter the pair of fly-eye lenses 15a and 15b, and are converted into a rectangular light flux having a uniform illuminance distribution. The rectangular light flux is then applied to DMD 14 via condenser lens 11a, mirror 13, and TIR prism 13, and subjected to light modulation according to an image signal. The rectangular light flux, which has been subjected to light modulation at DMD 14, passes through TIR prism 13 again to enter projection lens 10, and is magnified and projected to the projection surface from projection lens 10.

Coherent light that has high coherence, as in the case of the laser beam, has irregular patterns that are larger than the wavelength of the coherent light. For example, when the coherent light is applied to a rough surface such as a screen, the light is randomly scattered to generate spotty glistening bright and dark patterns called speckles. This is a random coherent phenomenon generated by superimposition of scattering lights of a single wavelength from respective points on the rough surface at each point of an observation surface.

Thus, in the projection-type display device using the laser light sources at a part or all of the R, G, and B light sources, when a video is projected to the projection surface of the screen, the laser beam is diffused on the projection surface of the screen to generate random noise (speckle noise) intensity in the light beam. In this case, when an observer watches the projected video on the screen to form a speckle image on the retina, the image is recognized as an unfocussed spotty glimmer. As a result, the observer feels uncomfortable or experiences fatigue, and the image that is viewed has undergone considerable quality deterioration.

In the projection-type display device that uses the laser beam as the light source, various methods for reducing such speckle noise have been provided.

In general, as a way to reduce speckle noise, there are two methods that include "achievement of incoherent laser beam" and "reduction of apparent speckle noise".

The method of "achievement of incoherent laser beam" is a method for removing incoherence of the laser beam to convert it into incoherent light. "Broadening of wavelength width by high-frequency superimposition of laser beams", "multiplexing of laser beam having delay larger than coherent distance", or "superimposition of polarized lights orthogonal to each other" corresponds to this method.

These methods are essentially designed to prevent speckles from being generated by changing the property of light itself.

The method of "reduction of apparent speckle noise" is a method for reducing apparent speckle noise by superimposing and integrating image speckle patterns for a plurality of times in the time which is less than or equal to time (less than or equal to 20 ms) that cannot be recognized by a human eye in order to average speckle noises until such a point is reached at which the noise is outside the range of the human eye. "Swinging of screen" or "vibration of optical component" corresponds to this method. In these methods, speckles themselves are generated because the nature of light itself is not essentially changed. However, by an illusion that occurs in the brain, the speckles are prevented from being recognized by the human eye.

As in the case of the former, when the speckle noise is reduced by converting the laser beam into incoherent light, an element included in the semiconductor laser or a driving circuit must be directly retouched, or the optical system must be greatly changed. However, it is difficult to obtain satisfactory effects only by one method, and thus the method, that is combined with other methods and that is a multiple method, is likely to be used in many cases.

On other hand, in the latter case, when the apparent speckle noise is reduced, effects are conspicuous because an illusion that occurs in the brain. However, among these methods, the method based on screen swinging is only applied to a certain projection-type display device such as a rear projector because the mechanism becomes large and restriction that is related to the screen also occurs.

Among the latter methods of "reduction of apparent speckle noise", "a method for reducing speckle noise by vibration of optical component" in particular will be described.

FIG. 2A is a perspective view showing a first configuration example according to a first related technology for reducing speckle noise. FIG. 2B is a perspective view showing a second configuration example according to the first related technology for reducing speckle noise. The first related technology is disclosed in Patent Literature 2. As shown in FIG. 2A, in the first configuration example according to the first related technology, a laser beam from laser light source 2d passes through collimator lens 3d, optical integrator 8b, and condenser lens 11b to be applied to spatial light modulation device 9d. In the first configuration example, a speckle pattern is temporally and spatially moved in an optical system by rotating optical integrator 8b including a pair of fly-eye lenses 15c and 15d around an optical axis. Accordingly, a speckle pattern formed on the retina of an observer is integrated to reduce apparent speckle noise.

As shown in FIG. 2B, in the second configuration example according to the first related technology, a laser beam from laser light source 2d passes through collimator lens 3d, condenser lens 24a, optical integrator 8c, and condenser lens 11b to be applied to spatial light modulation device 9d. In the second configuration example, similar effects are obtained by rotating, as optical integrator 8c, rod-type optical integrator 23a that is a transparent medium such as glass having a rectangular section around an optical axis as in the case of the first configuration example.

FIG. 3A is a plan view showing a first configuration example according to a second related technology for reducing speckle noise. FIG. 3B is a plan view showing a second configuration example according to the second related technology for reducing speckle noise. The second related technology is disclosed in Patent Literature 3. As shown in FIG. 3A, in the first configuration example according to the second related technology, diffusion plate 19f, that is a dynamic scattering medium rotated by motor 25, is disposed on an optical path between a pair of condenser lens 24b and collector lens 26a. As shown in FIG. 3B, in the second configuration example according to the second related technology, diffusion plate 19g, that is a dynamic scattering medium vibrated by transducer 27 of signal source 28, is disposed on an optical path between a pair of condenser lens 24c and collector lens 26b. With these configurations, because of the arrangement of diffusion plates 19f and 19g on the optical paths, scattering states on the optical paths are changed to temporally and spatially vibrate a speckle pattern. Accordingly, a speckle pattern formed on the retina of an observer is integrated to reduce apparent speckle noise.

FIG. 4A is a plan view showing a first configuration example according to a third related technology for reducing speckle noise. FIG. 4B is a plan view showing a second configuration example according to the third related technology for reducing speckle noise. The third related technology is disclosed in Patent Literature 4. As shown in FIG. 4A, in the first configuration example according to the third related technology, diffusion plate 19h is disposed on an optical path between beam magnifying optics 30 including a magnifying lens (collimator lens 3e) and collimator lens 3f and beam shaping optics 31 including a pair of fly-eye lenses 15e and 15f and condenser lenses 11c and 11d, through which a laser beam from laser light source 2e passes, and diffusion plate 19h is vibrated by means for applying motion 32a. Accordingly, by temporally and spatially vibrating a speckle pattern, a speckle pattern formed on the retina of an observer is integrated to reduce apparent speckle noise. As shown in FIG. 4B, in the second configuration example according to the third related technology, in addition to the first configuration example, diffusion plate 19i is also disposed between beam shaping optics 31 and spatial light modulation device 9d. By common or individual means for applying motion 32a and 32b, two diffusion plates 19h and 19i are vibrated, thereby enhancing the effect of reducing speckle noise.

FIG. 5A is a plan view showing a first configuration example according to a fourth related technology for reducing speckle noise. FIG. 5B is a plan view showing a second configuration example according to the fourth related technology for reducing speckle noise. The fourth related technology is disclosed in Patent Literature 5. As shown in FIG. 5A, in the first configuration example according to the fourth related technology, as in the case of the third related technology, diffusion plate 19j is disposed on an optical path between field lens 11f and spatial light modulation device 9e, through which a laser beam from laser light source 2f passes, and diffusion plate 19j is connected to diffusion plate swinging unit 36. In the first configuration example, a pair of fly-eye lenses 15g and 15h is used as optical integrator 8d. In the first configuration example, speckle noise is effectively reduced by setting a swinging speed V to satisfy "V>d×30" (displacement amount per second), where V (mm/s) is a swinging speed of diffusion plate 19j and d (mm) is a particle size of diffusion plate 19j. In addition, the loss of a certain amount of light of a laser beam caused by the diffusion plate is prevented by setting the diffusion angle of the diffusion plate to be limited based on a relationship between the numerical aperture of the illumination optical system and the brightness of the projection lens. As shown in FIG. 5B, in the second configuration example according to the fourth related technology, a case, where rod-type optical integrator 23b which is used in place of the pair of fly-eye lenses 15g and 15h and which is used as optical integrator 8e, is disclosed.

CITATION LIST

Patent Literature 1: JP2010-237443A
Patent Literature 2: JP3975514B
Patent Literature 3: JP7-297111A
Patent Literature 4: JP4303926B
Patent Literature 5: JP4158987B
Patent Literature 6: U.S. Pat. No. 4,035,068B

SUMMARY OF INVENTION

Problems to be Solved by Invention

As described above, in the projection-type display device using a part or all of the laser beams as the light sources, to reduce the speckle noise that causes the image quality to deteriorate, various methods for reducing the apparent speckle noise by swinging the optical integrator or the diffused object to integrate and average the speckle patterns formed on the retina of the observer have been offered.

However, in the case of the configuration where the optical integrator is rotated around the optical axis, the mechanism for rotating the optical integrator is enlarged to cause an increase in the manufacturing cost, the mounting volume and power consumption.

The power consumption will be explained in a brief supplement. As described above in the "Background Art", in the projection-type display device using the laser beam as a light source alternative to the lamp, a separate optical system is unnecessary, and the size of the light source itself is reduced. Thus, the entire optical system can be easily miniaturized. In addition, since the power consumption of the laser light source is much smaller than the lamp light source, it is thought that this laser light source will be applied to new field such as mobile devices which rely on battery power. In such a case, a reduction in power consumption of the entire device is needed. Therefore, it is undesirable to have to use additional power to run a mechanism in order to reduce speckle noise.

As described above in the second to fourth related technologies, the method for reducing speckle noise by swinging the diffusion plate disposed on the optical path using the motor, the transducer, or other means for swinging is also disclosed in Patent Literature 6 issued in 1977. However, as in the case of the first related technology, the method disclosed in Patent Literature 6 has problems in which in inclusion of the means for swinging of the diffusion plate causes an increase in manufacturing cost, a mounting volume, and power consumption.

The present invention has been developed to solve the aforementioned problems, and it is an object of the invention to provide a light source device capable of reducing the manufacturing cost and power consumption of a mechanism for vibrating a diffusion plate, achieving miniaturization, and reducing speckle noise, and a projection-type display device.

Solution to Problem

To achieve the object, a light source device according to the present invention includes: a laser light source; a fluorescent plate which has a fluorescent body that emits light by using light from the laser light source as excitation light; a motor which rotates the fluorescent plate; an optical member which transmits the light from the fluorescent body while reflecting the light from the laser light source; a diffusion plate which diffuses the light from the laser light source; and an elastic member which interconnects the diffusion plate and the motor.

Effects of Invention

According to the present invention, by interconnecting the motor which rotates the fluorescent plate that has the fluorescent body and the diffusion plate via the elastic member, elasticity of the elastic member causes large vibration, that are transmitted through a solid substance, of the motor. Thus, the elastic member can efficiently vibrate the diffusion plate. As a result, speckle noise can be reduced. Thus, according to the present invention, the manufacturing cost and the power consumption of the mechanism for vibrating the diffusion plate can be reduced, and miniaturization can be achieved.

DESCRIPTION OF EMBODIMENTS

Hereinafter, the embodiments of the present invention will be described with reference to the drawings.

Figure 1A:
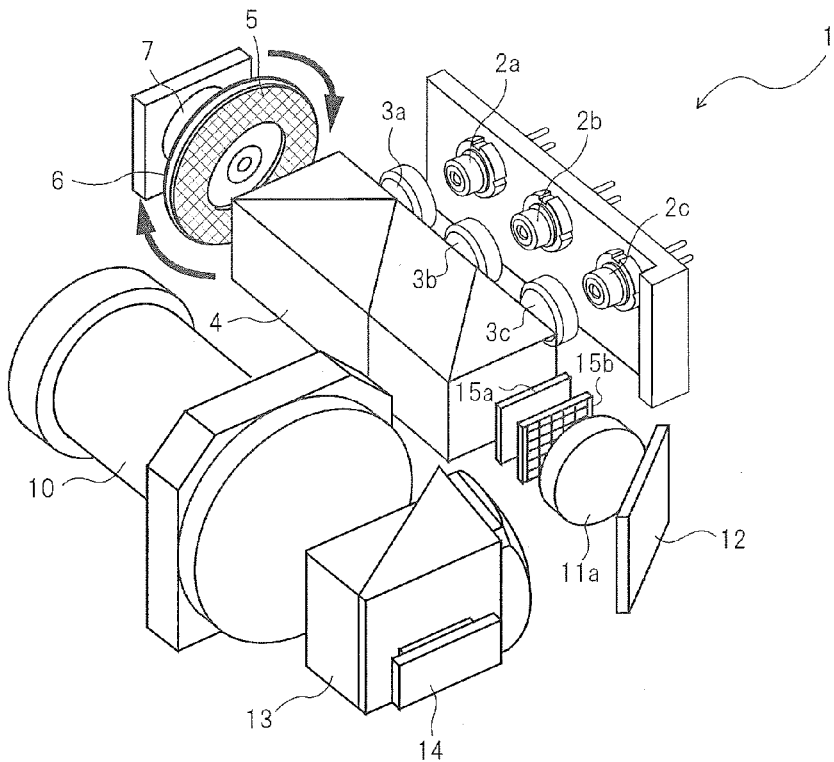
FIG. 1A is a perspective view schematically showing the configuration example of a projection-type display device that uses a hybrid light source combining a laser beam and fluorescent light.
Figure 1B:
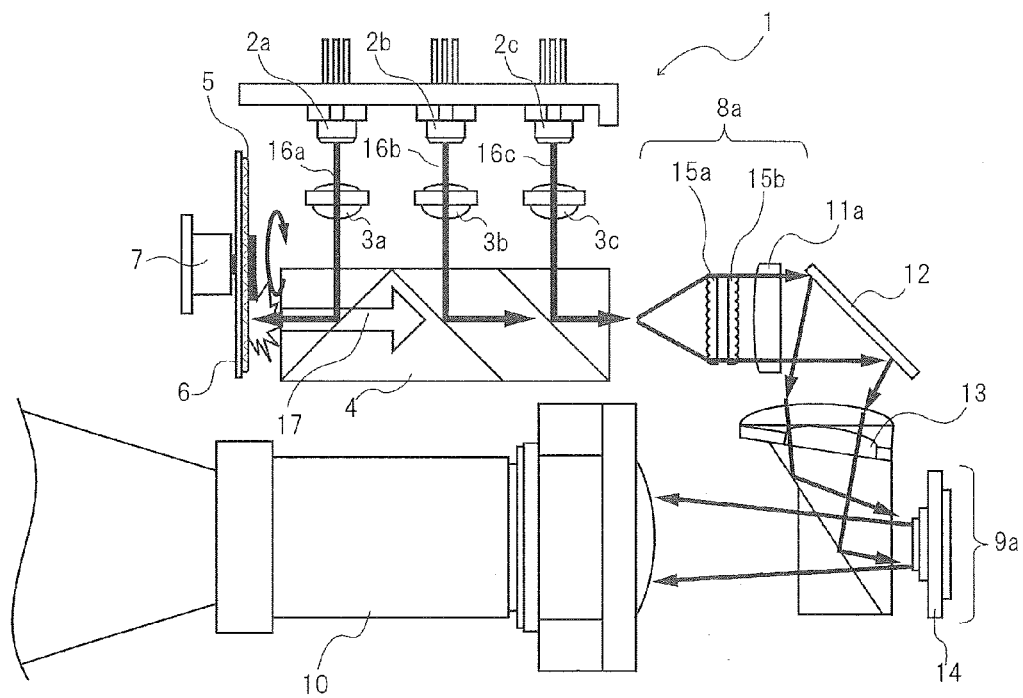
FIG. 1B is a plan view schematically showing the configuration example of the projection-type display device that uses the hybrid light source.
Figure 2A:
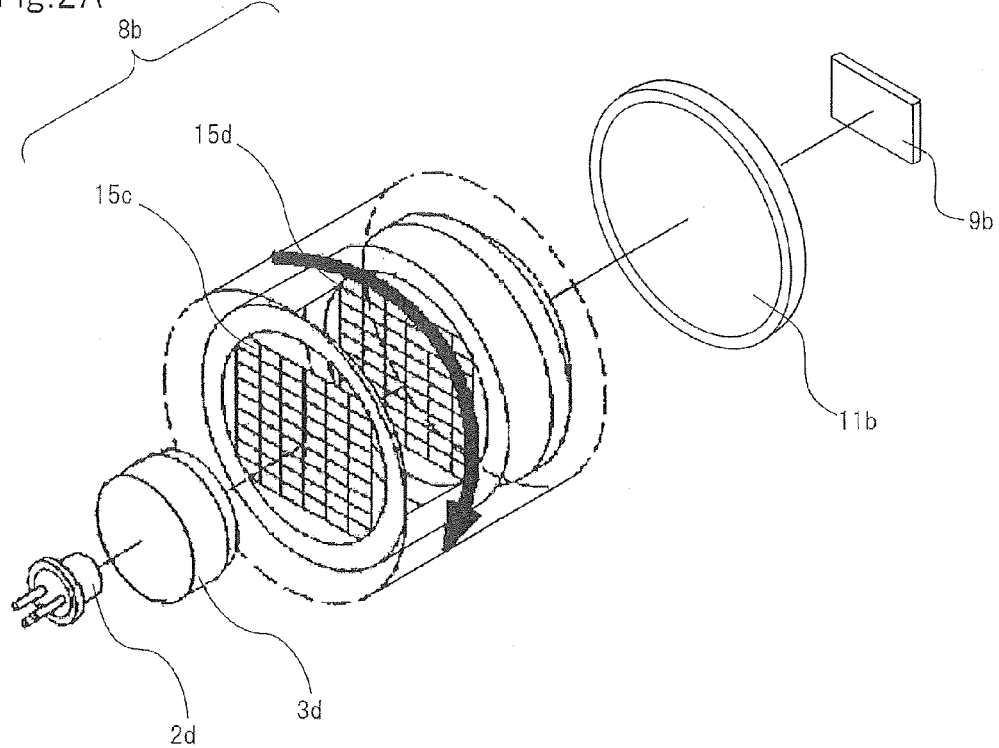
FIG. 2A is a perspective view showing a first configuration example according to a first related technology for reducing speckle noise.
Figure 2B:
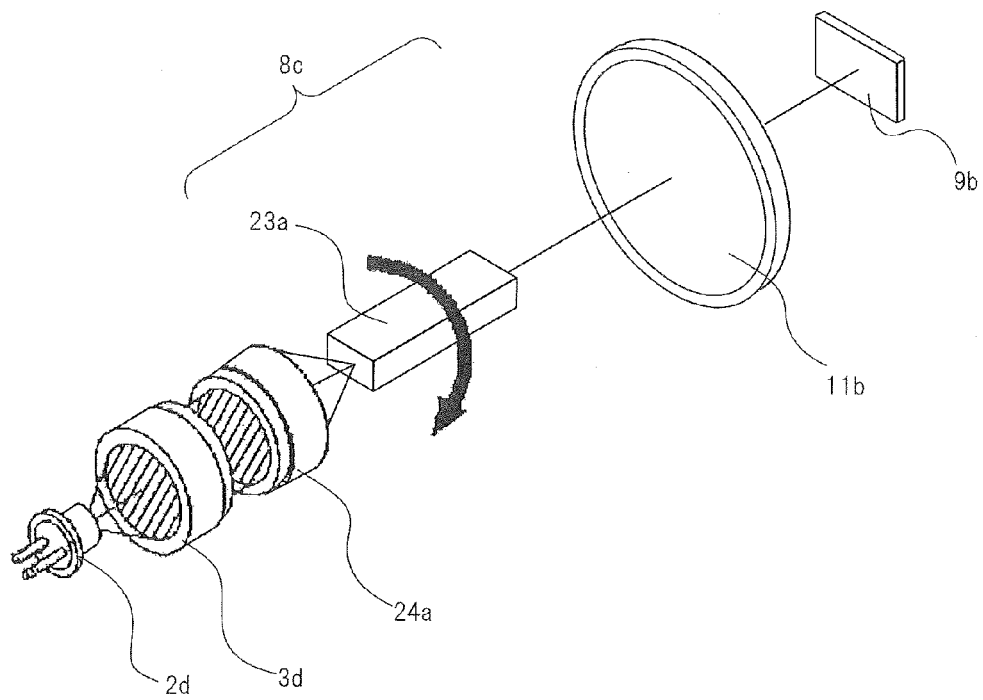
FIG. 2B is a perspective view showing a second configuration example according to the first related technology for reducing speckle noise.
Figure 3A:
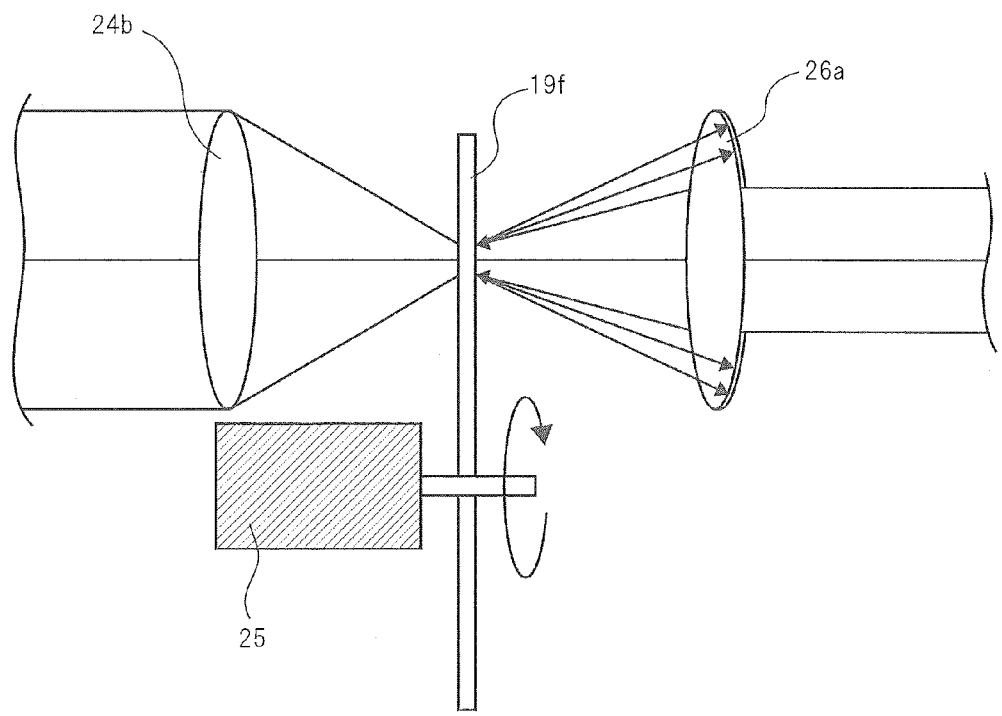
FIG. 3A is a plan view showing a first configuration example according to a second related technology for reducing speckle noise.
Figure 3B:
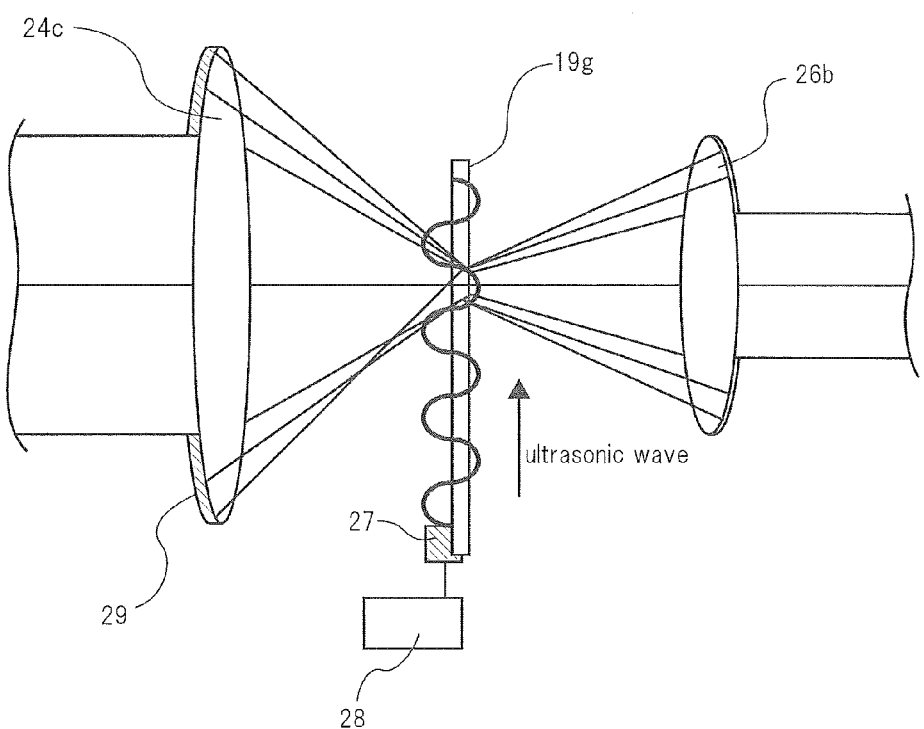
FIG. 3B is a plan view showing a second configuration example according to the second related technology for reducing speckle noise.
Figure 4A:
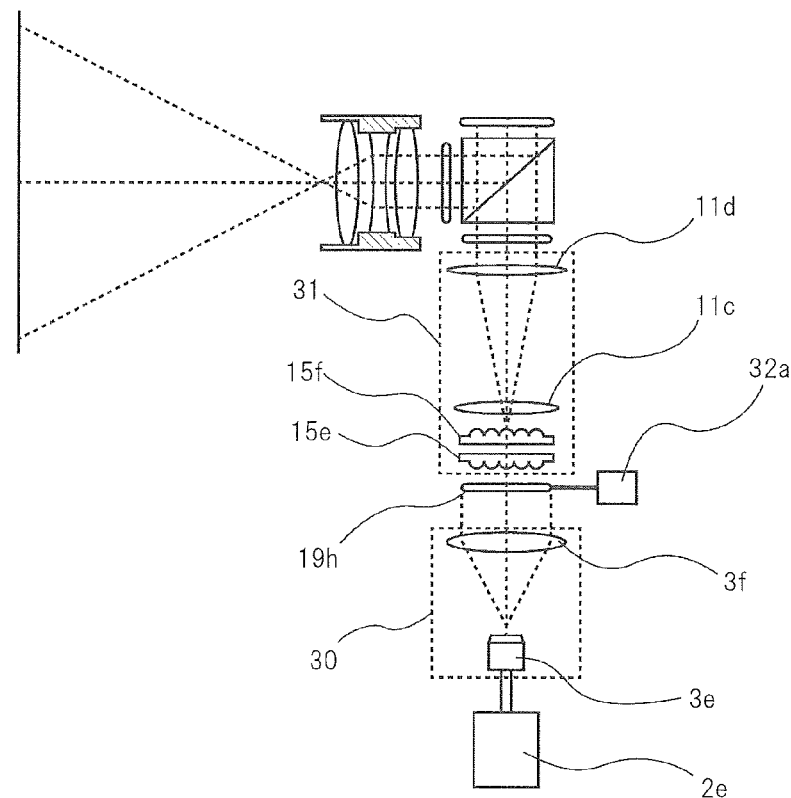
FIG. 4A is a plan view showing a first configuration example according to a third related technology for reducing speckle noise.
Figure 4B:
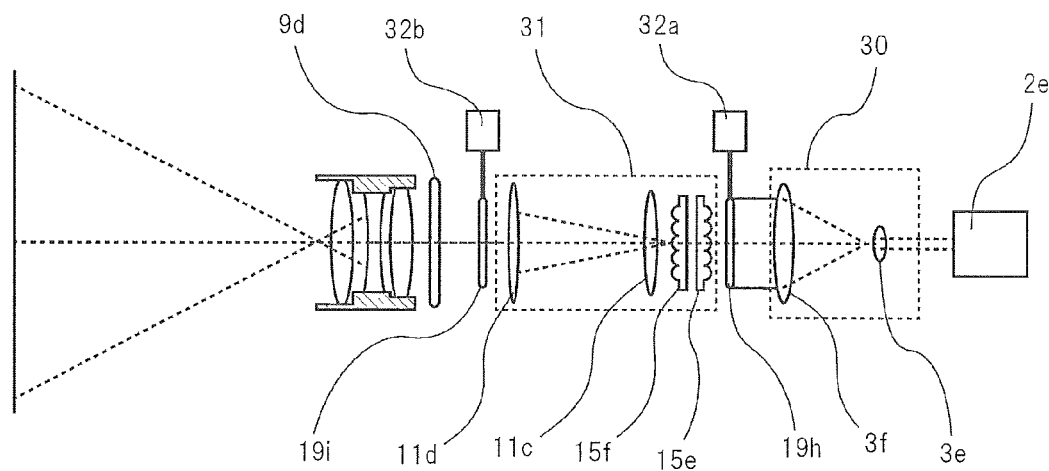
FIG. 4B is a plan view showing a second configuration example according to the third related technology for reducing speckle noise.
Figure 5A:
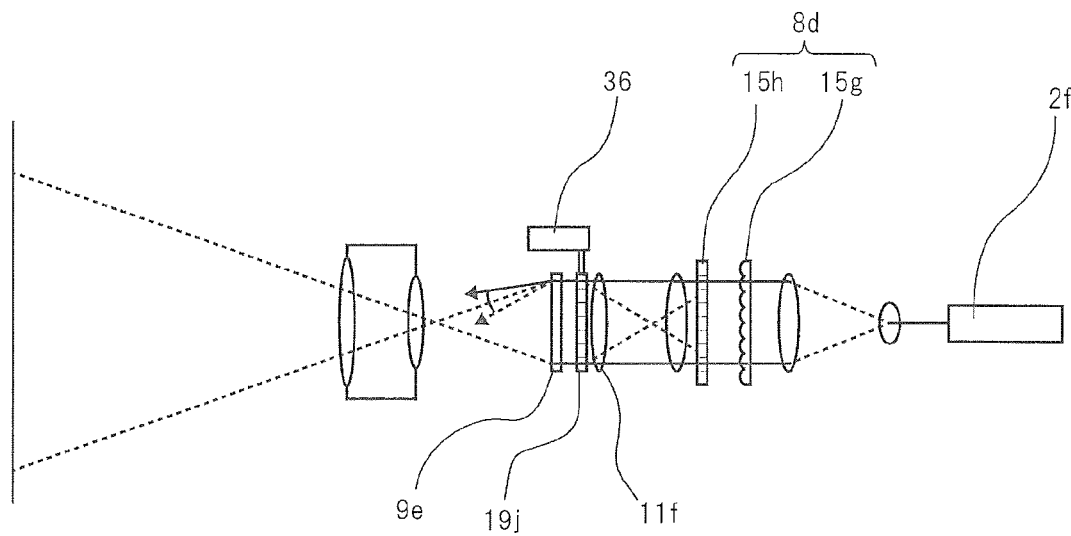
FIG. 5A is a plan view showing a first configuration example according to a fourth related technology for reducing speckle noise.
Figure 5B:
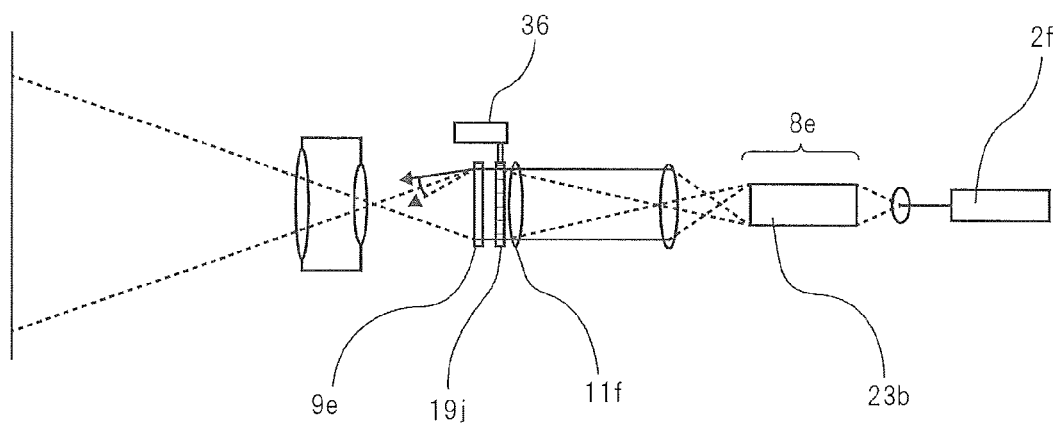
FIG. 5B is a plan view showing a second configuration example according to the fourth related technology for reducing speckle noise.

The configuration of a projection-type display device that uses a hybrid light source combining a semiconductor laser and fluorescent light has been described in the "Background Art" referring to FIGS. 1A and 1B. Based on the configuration of the projection-type display device shown in FIGS. 1A and 1B, a projection-type display device, according to each of the embodiments, has the same technical features as those of the present invention. Thus, for convenience, in the embodiments, components similar to those of the projection-type display device shown in FIGS. 1A and 1B will be denoted by similar reference numerals and thus description will be omitted, and only components different from those shown in FIGS. 1A and 1B will be described.

First Embodiment

Figure 6A:
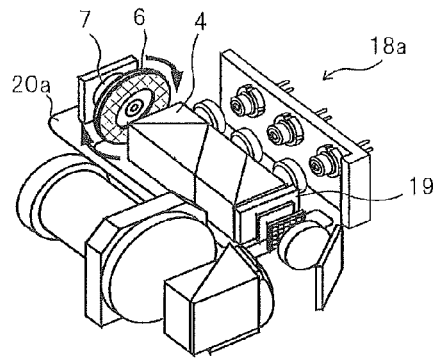
FIG. 6A is a perspective view schematically showing a projection-type display device according to a first embodiment.
Figure 6B:
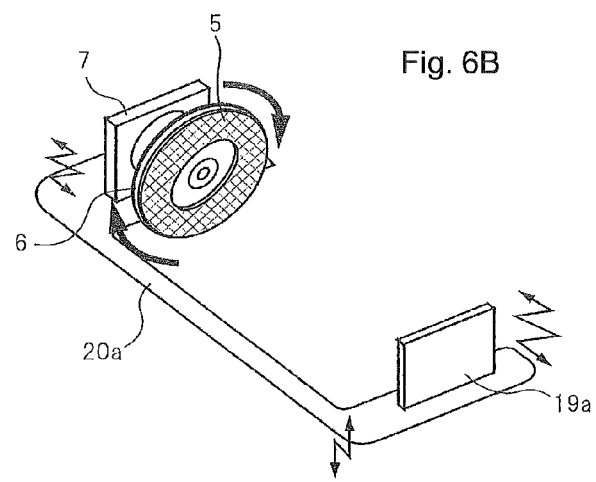
FIG. 6B is a perspective view showing a structure where a wheel motor and a diffusion plate are interconnected via a plate spring in a light source device included in the projection-type display device according to the first embodiment.
Figure 6C:
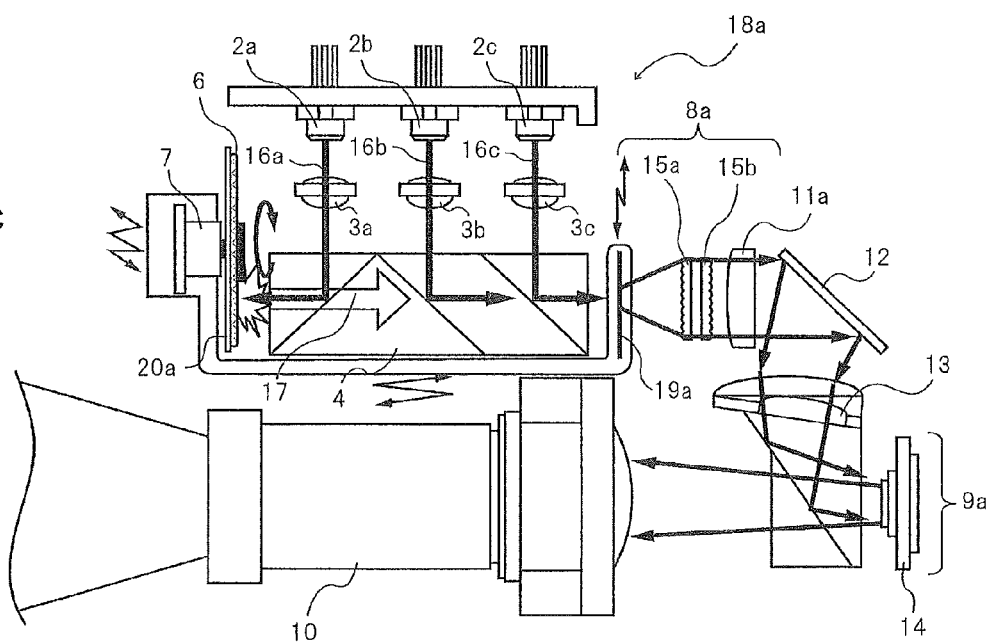
FIG. 6C is a plan view showing the projection-type display device according to the first embodiment.

FIG. 6A is a perspective view schematically showing a projection-type display device according to a first embodiment. FIG. 6B is a perspective view showing a structure where a wheel motor and a diffusion plate are interconnected via a plate spring according to the first embodiment. FIG. 6C is a plan view showing the projection-type display device according to the first embodiment.

As shown in FIGS. 6A to 6C, in light source device 18a included in the projection-type display device according to the first embodiment, in related light source device 1 shown in FIGS. 1A and 1B, diffusion plate 19a is disposed on the optical path between dichroic prism 4 as an optical member and fly-eye lens 15a included in optical integrator 8a. Dichroic prism 4 includes a plurality of optical films that transmit light from fluorescent body 5 while reflecting lights from laser light sources 2a to 2c. Optical integrator 8a makes uniform the illuminance distribution of light diffused by diffusion plate 19a to shape the light into a rectangular light flux.

Diffusion plate 19a and wheel motor 7 for rotating circular substrate 6 that is a fluorescent plate coated with fluorescent body 5 are interconnected via plate spring 20a as an elastic member. The rotation axis of wheel motor 7 is fixed to the center of circular substrate 6. As shown in FIGS. 6B and 6C, plate spring 20a is made of a metallic material or a resin material, and formed into a belt shape that extends along the optical path from wheel motor 7 to diffusion plate 19a. Wheel motor 7 is disposed at one end in the extending direction of plate spring 20a. Diffusion plate 19a is disposed at the other end in the extending direction of plate spring 20a.

Next, a projection operation according to the first embodiment will be described.

As described above in the configurations of the related technology shown in FIGS. 1A and 1B in the "Background Art", during the projection operation, circular substrate 6 coated with fluorescent body 5 irradiated with a part of a laser beam to emit fluorescent light is fixed to the rotation axis of wheel motor 7 to always rotate at a high speed.

As shown in FIG. 6B, wheel motor 7 is connected to one end of plate spring 20a, and plate spring 20a is vibrated based on the vibration waves, that are transmitted through a solid substance, according to the rotational speed of wheel motor 7. At this time, diffusion plate 19a, disposed at the other end of plate spring 20a and on the optical path, is also vibrated by amplifying the amplitude of the vibration waves that are transmitted through a solid substance.

Thus, as shown in FIG. 6C, since the speckle patterns of laser beams 16a to 16c that passed through vibrated diffusion plate 19a are superimposed a plurality of times to be integrated, the speckles of projected light are averaged, and speckle noise can be reduced.

A resonance frequency determined by the rigidity of plate spring 20a and the mass of diffusion plate 19a is desirably set to match the frequency of vibration waves of wheel motor 7, that are transmitted through a solid substance. Accordingly, the amplitude of diffusion plate 19a can be amplified so that the displacement amount (dependent on amplitude of diffusion plate 19a) of speckle patterns formed on the retina of an observer watching a projected video can be larger than the average size of speckle patterns. As a result, the speckle noise can be reduced more effectively.

For example, when the rotational speed of wheel motor 7 is 7200 rpm, the frequency of vibration waves that are transmitted through a solid substance fD (Hz) of wheel motor 7 is calculated by the following formula:

$$fD = 7200/60 = 120 \text{ (Hz)} \quad (1)$$

The bending rigidity K (N/m) of plate spring 17a is set to satisfy the following formula, where m (kg) is the mass of diffusion plate 19a:

$$K = m \times (2\pi fD)^2 \quad (2)$$

Then, diffusion plate 19a resonates with displacement corresponding to the response amplitude of plate spring 17a in the frequency of vibration waves that are transmitted through a solid substance fD.

Thus, during the projection operation, diffusion plate 19a can be vibrated by using the kinetic energy of wheel motor 7 for rotating fluorescent body 5. As a result, speckle noise can be effectively removed without consuming any driving power for vibrating diffusion plate 19a. As compared with a case where a mechanism, that vibrates the diffusion plate, is separately disposed, the speckle noise can be effectively removed without increasing the noise of the motor or the like.

According to the embodiment, a mechanism is configured that causes diffusion plate 19a (mechanism for reducing speckle noise) to vibrate just due to mechanically interconnecting wheel motor 7 and diffusion plate 19a that are prepared as existing components using simple plate spring 17a. Thus, the manufacturing cost of the mechanism can be reduced, and power saving and miniaturization can be achieved.

Second Embodiment

A projection-type display device according to a second embodiment will be described referring to the drawings. For simpler description, only the differences of the second embodiment from the first embodiment will be described, while description of components similar to those of the first embodiment will be omitted.

Figure 7A:
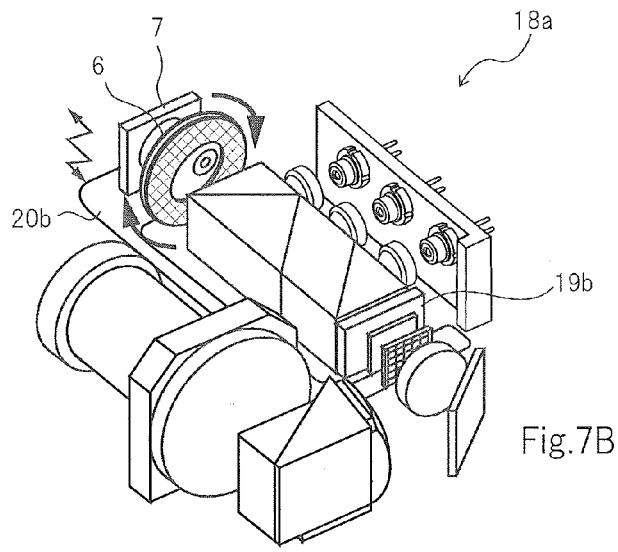
FIG. 7A is a perspective view schematically showing a projection-type display device according to a second embodiment.
Figure 7B:
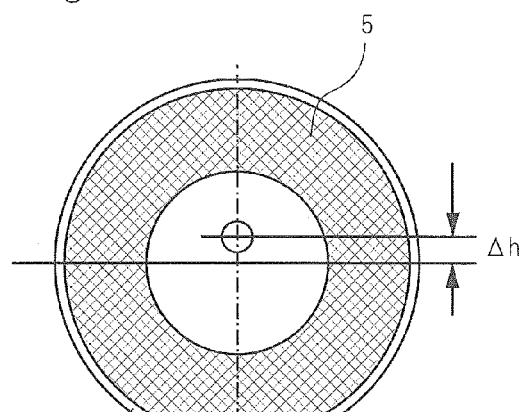
FIG. 7B is a perspective view showing a structure where a wheel motor and a diffusion plate are interconnected via a plate spring in a light source device included in the projection-type display device according to the second embodiment.
Figure 7C:
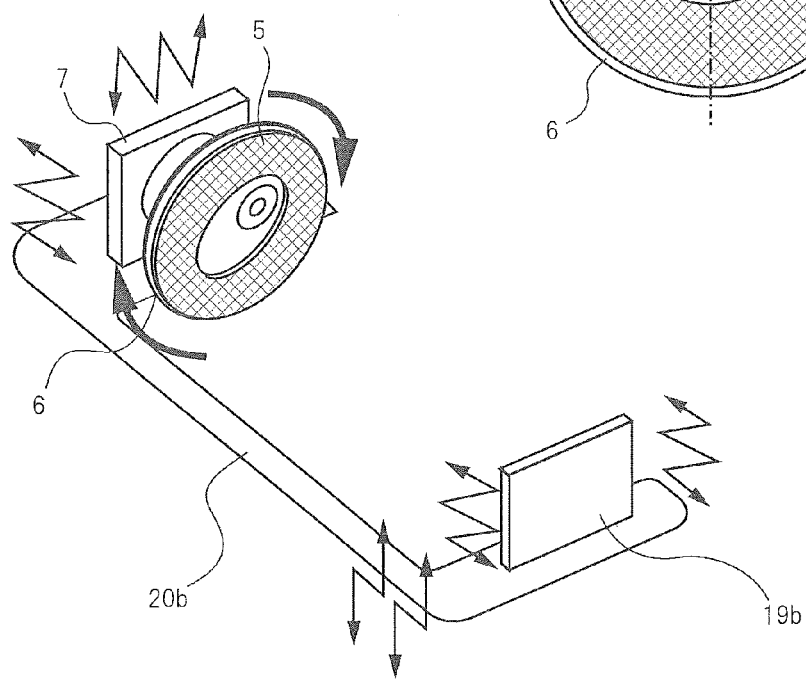
FIG. 7C is a front view showing a circular substrate in the light source device included in the projection-type display device according to the second embodiment.

FIG. 7A is a perspective view schematically showing the projection-type display device according to the second embodiment. FIG. 7B is a perspective view showing a structure where a wheel motor and a diffusion plate are interconnected via a plate spring in the projection-type display device according to the second embodiment. FIG. 7C is a front view showing a circular substrate according to the second embodiment.

As shown in FIGS. 7A to 7C, in light source device 18b included in the projection-type display device according to the second embodiment, in light source device 18a according to the first embodiment, circular substrate 6 coated with fluorescent body 5 is configured by fixing the rotation axis of wheel motor 7 at a position deviated by an eccentric amount Δh from the center in a diameter direction. In the second embodiment, as in the case of the first embodiment, wheel motor 7 and diffusion plate 19b are interconnected via plate spring 20b.

The second embodiment is applied when in the first embodiment, the vibration amplitude of the diffusion plate is set larger, and the integration effect of the speckle patterns is enhanced, thereby further reducing the speckle noise. The second embodiment is applied when because of design constraints such as the external size of the plate spring and the rotational speed of the wheel motor, it is difficult to match the resonance frequency of the plate spring for interconnecting the wheel motor and the diffusion plate with the frequency of vibration waves of the wheel motor, that are transmitted through a solid substance, or when a diffusion plate having a small diffusion angle must be used to prevent the loss of efficiency using light.

In the second embodiment, circular substrate 6 coated with fluorescent body 5 rotates while being made eccentric. Thus, the amplitude of the solid propagation frequency of wheel motor 7 that is a vibration generation source for plate spring 20b can be set large according to the eccentric amount Δh of circular substrate 6.

Thus, according to the second embodiment, the response amplitude of diffusion plate 19b in the resonance frequency of plate spring 20b can be set larger. Even when plate spring 20b cannot be vibrated with the resonance frequency of plate spring 20b, sufficient vibration amplitude of diffusion plate 19b can be obtained. As a result, a satisfactory integration effect of speckle patterns can be obtained. According to the embodiment, even when a diffusion plate having a small diffusion angle is used, a satisfactory integration effect of the speckle patterns can be obtained by enlarging the vibration amplitude of the diffusion plate.

According to the second embodiment, as in the case of the first embodiment, a mechanism for reducing speckle noise can be miniaturized, and power consumption, noise, and manufacturing cost can be reduced.

Third Embodiment

A projection-type display device according to a third embodiment will be described referring to the drawings. For simpler description, only the differences between the third embodiment and the first and second embodiments will be described, while description of components similar to those of the first and second embodiments will be omitted.

Figure 8A:
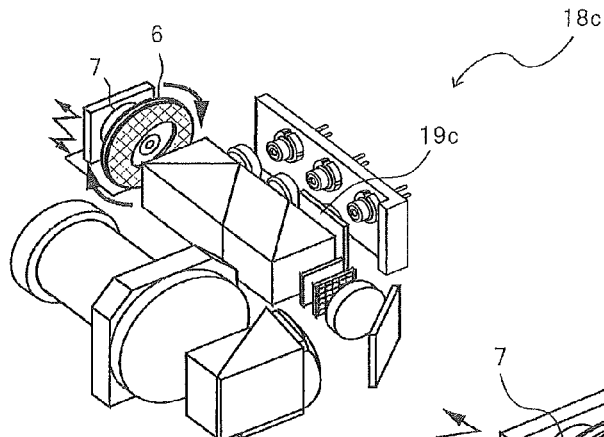
FIG. 8A is a perspective view schematically showing a projection-type display device according to a third embodiment.
Figure 8B:
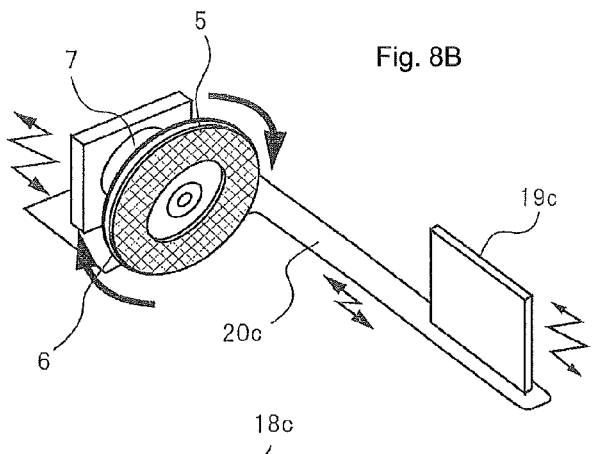
FIG. 8B is a perspective view showing a structure where a wheel motor and a diffusion plate are interconnected via a plate spring in a light source device included in the projection-type display device according to the third embodiment.
Figure 8C:
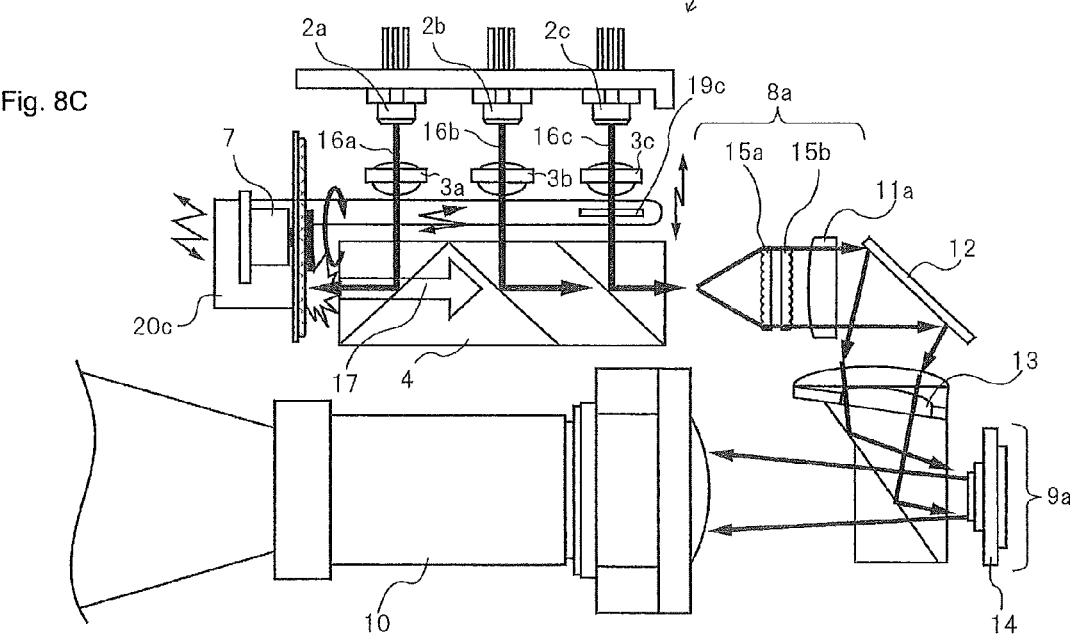
FIG. 8C is a plan view showing the projection-type display device according to the third embodiment.

FIG. 8A is a perspective view schematically showing the projection-type display device according to the third embodiment. FIG. 8B is a perspective view showing a structure where a wheel motor and a diffusion plate are interconnected via a plate spring in the projection-type display device according to the third embodiment. FIG. 8C is a plan view showing the projection-type display device according to the third embodiment.

As shown in FIGS. 8A to 8C, in light source device 18c included in the projection-type display device according to the third embodiment, in light source devices 18a and 18b according to the first and second embodiments, diffusion plate 19c is disposed at a position between collimator lens 3c and dichroic prism 4 on an optical path of, from among laser light sources 2b and 2c used for other than excitation of a fluorescent body, laser beam 2c whose wavelength has the highest visibility. In the third embodiment, as in the aforementioned case, wheel motor 7 and diffusion plate 19c are interconnected via plate spring 20c.

The third embodiment is suitably used when speckle noise must be reduced as much as possible while the loss of efficiency using light affected by transmittance of the diffusion plate in an optical system is reduced as much as possible.

Generally, speckles are more conspicuous in a wavelength having high visibility. In the case of the three primary color lights of R, G, and B, speckle noise is distinctly recognized in order of G>R>B.

The transmittance of the diffusion plate is about 85% to 98% while the transmittance of the diffusion plate depends on a material or a diffusion angle. Thus, light loss occurs when the diffusion plate is disposed on the optical path.

Thus, in the third embodiment, diffusion plate 19c is disposed only on, for example, the optical path of green laser beam 2c having highest visibility, which is most effective for reducing the speckle noise, and diffusion plate 19c is vibrated by using the vibration waves of wheel motor 7, that are transmitted through a solid substance. As a result, the speckle noise is prevented from being distinct as much as possible while the loss of brightness is limited to a minimum.

According to the configuration of the third embodiment, since diffusion plate 19c can be disposed at a position nearer to wheel motor 7, the size of plate spring 20c is reduced, providing an advantage of realizing a more compact configuration including plate spring 20c. According to the third embodiment, as in the case of the first and second embodiments, power consumption and noise of a mechanism for reducing the speckle noise can be reduced, miniaturization can be achieved, and manufacturing costs can be reduced.

Fourth Embodiment

A projection-type display device according to a fourth embodiment will be described referring to the drawings. As in the aforementioned case, for simpler description, only the differences between the fourth embodiment and the third embodiment will be described, while description of components similar to those of the aforementioned embodiments will be omitted.

Figure 9:
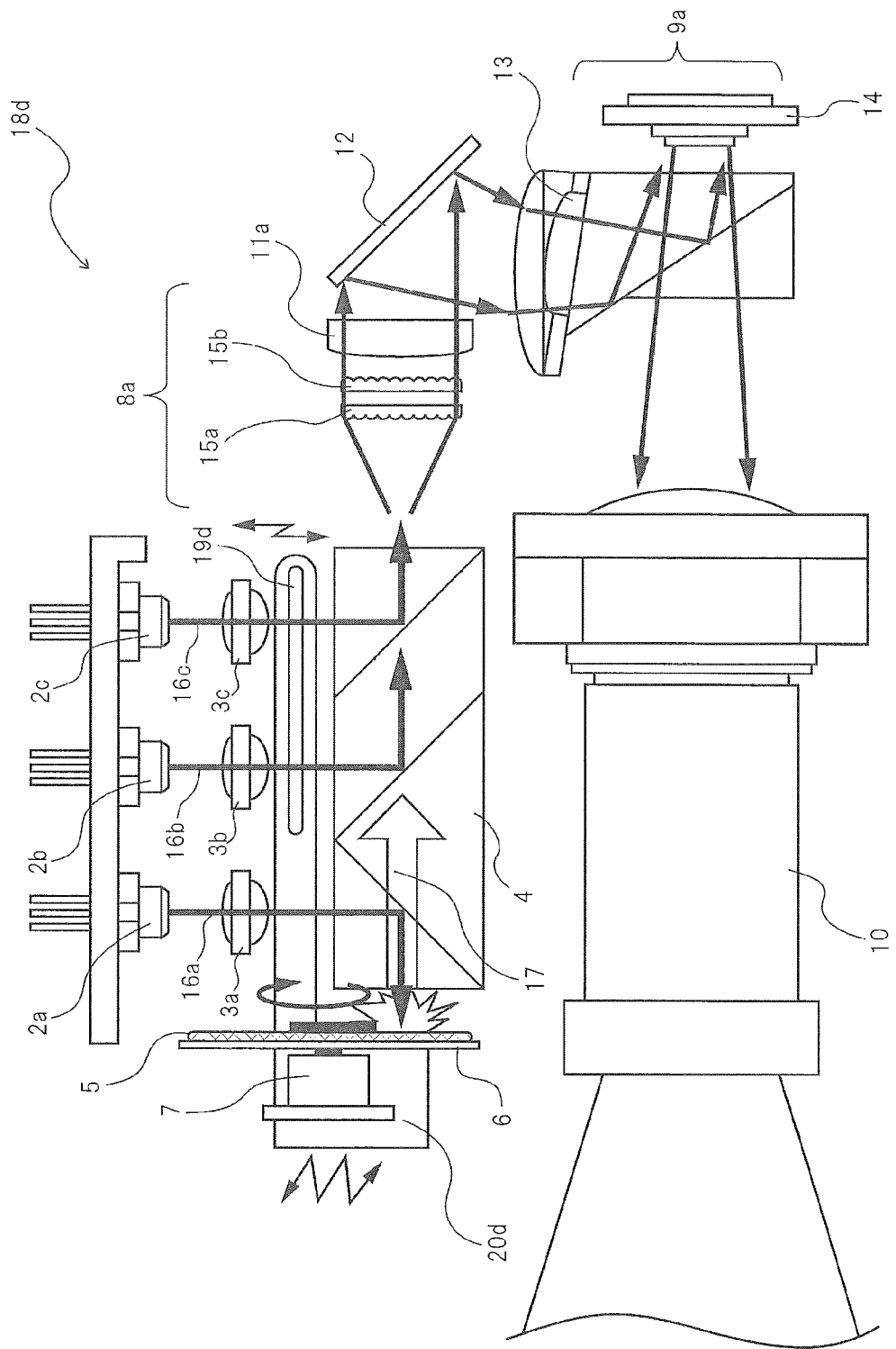
FIG. 9 is a plan view schematically showing a projection-type display device according to a fourth embodiment.

FIG. 9 is a plan view schematically showing the projection-type display device according to the fourth embodiment. As shown in FIG. 9, in light source device 18d included in the projection-type display device according to the fourth embodiment, diffusion plate 19d in light source device 18c according to the third embodiment is disposed between collimator lenses 3b and 3c and dichroic prism 4 on the optical paths of laser light sources 2b and 2c used for other than excitation of a fluorescent body. Diffusion plate 19d is disposed over the optical paths of two laser light sources 2b and 2c. In the fourth embodiment, as in the aforementioned case, diffusion plate 19d is connected to wheel motor 7 via plate spring 20d.

The configuration of the fourth embodiment, the object of which is similar to that of the third embodiment, is applied when there is room for outputs of laser light sources 2b and 2c because the arrangement of diffusion plate 19d on the optical paths of laser light sources 2b and 2c causes the loss of light. According to the embodiment, in principle, because of the configuration where vibrated diffusion plate 19d is disposed on the optical paths other than the optical path of fluorescent light in which speckle noise is not generated, compared with the third embodiment, the effect of reducing speckle noise can be further enhanced.

According to the fourth embodiment, as in the case of the aforementioned embodiments, power consumption and noise of a mechanism for reducing the speckle noise can be reduced, miniaturization can be achieved, and manufacturing costs can be reduced.

Fifth Embodiment

A projection-type display device according to a fifth embodiment will be described referring to the drawings. For simpler description, only the differences between the fifth embodiment and the fourth embodiment will be described, while description of components similar to those of the aforementioned embodiments will be omitted.

Figure 10A:
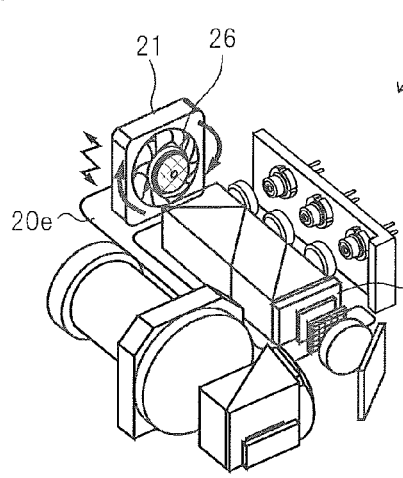
FIG. 10A is a perspective view schematically showing a projection-type display device according to a fifth embodiment.
Figure 10B:
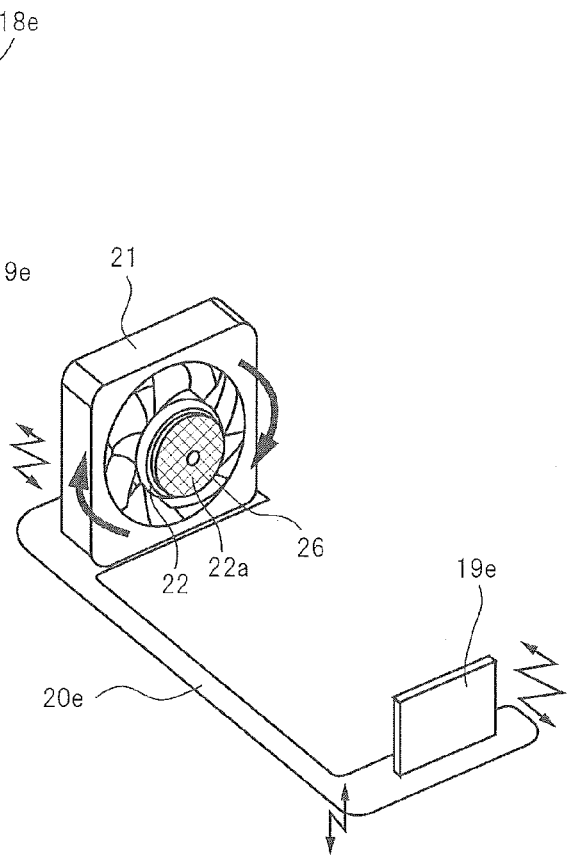
FIG. 10B is a perspective view showing a structure where a wheel motor and a diffusion plate are interconnected via a plate spring in a light source device included in the projection-type display device according to the fifth embodiment.
Figure 10C:
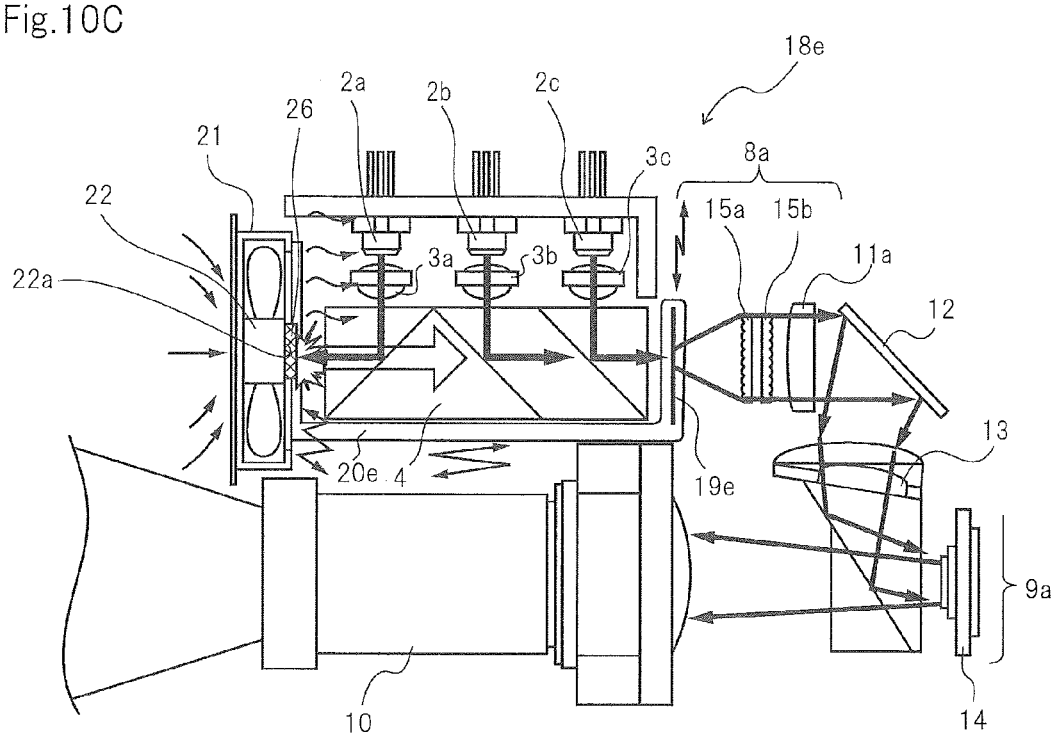
FIG. 10C is a plan view showing the projection-type display device according to the fifth embodiment.

FIG. 10A is a perspective view schematically showing the projection-type display device according to the fifth embodiment. FIG. 10B is a perspective view showing a structure where a wheel motor and a diffusion plate are interconnected via a plate spring in the projection-type display device according to the fifth embodiment. FIG. 10C is a plan view showing the projection-type display device according to the fifth embodiment.

The object of the fifth embodiment is to miniaturize a mechanism for reducing speckle noise, reduce manufacturing costs, and reduce power consumption and noise more than the first embodiment.

Accordingly, as shown in FIGS. 10B and 10C, in light source device 18e included in the projection-type display device according to the fifth embodiment, circular substrate 26 containing a not-shown fluorescent body is fixed, by an adhesive, to hub surface 22a of hub 22 included in cooling fan 21 for cooling laser light sources 2a to 2c, hub surface 22a being a surface orthogonal to a rotation axis. Cooling fan 19 and diffusion plate 19e are interconnected via plate spring 20e.

Circular substrate 26 is formed by mixing a fluorescent body and a base material, and functions similarly to circular substrate 6 coated with fluorescent body 5. The fluorescent body can be mixed in hub surface 22a of hub 22 included in cooling fan 21. In the aforementioned embodiment, circular substrate 26 containing the fluorescent body can be used in place of circular substrate 6.

The fifth embodiment is directed to the configuration using an axial fan. However, even when other blowers such as a sirocco fan are used, the effect of reducing speckle noise can be similarly provided. When the sirocco fan is used, though not shown, a circular substrate containing a fluorescent body is disposed on the end surface of a cylindrical fan.

Generally, in a semiconductor laser, there is a possibility that when the operation temperature is high, the oscillation wavelength may be shifted to the high wavelength side, the life may be shortened, or the light output may be lowered.

To prevent this, in a laser light source having a high-output semiconductor laser, forced air cooling is carried out by using a cooling fan as a blower to cool the laser light source. In the first to fourth embodiments, though not shown, the laser light sources are similarly cooled by using cooling fans when necessary.

In the fifth embodiment, the motor of cooling fan 21 used for cooling laser light sources 2a to 2c is also used as a wheel motor for rotating circular substrate 26, and diffusion plate 19e is vibrated by using the vibration waves of the motor, that are transmitted through a solid substance, to reduce speckle noise.

Thus, according to the fifth embodiment, the number of driving motors (motor of cooling fan, wheel motor of circular substrate having fluorescent body, and vibration motor of diffusion plate) mounted on the projection-type display device can be reduced by integrating the driving motors into one. As a result, according to the fifth embodiment, compared with the first embodiment, the effect of reducing speckle noise can be similarly provided, further miniaturization can be achieved, manufacturing costs can be reduced more, and power consumption and noise can be further reduced.

In the fifth embodiment, as the wheel motor for rotating circular substrate 26, the motor of cooling fan 19 for blowing air to cool laser light sources 2a to 2c is used. However, the motors of other blowers such as an exhaust fan for discharging air out of the case (not shown) of the projection-type display device can also be used.

Sixth Embodiment

A projection-type display device according to a sixth embodiment will be described referring to the drawings. For simpler description, only the differences between the sixth embodiment and the fourth embodiment will be described, while description of components similar to those of the aforementioned embodiments will be omitted.

Figure 11A:
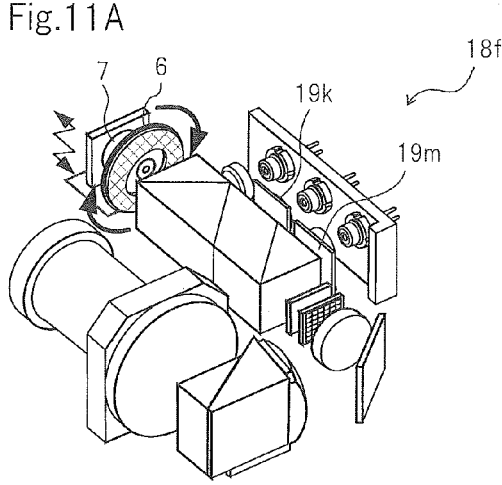
FIG. 11A is a perspective view schematically showing a projection-type display device according to a sixth embodiment.
Figure 11B:
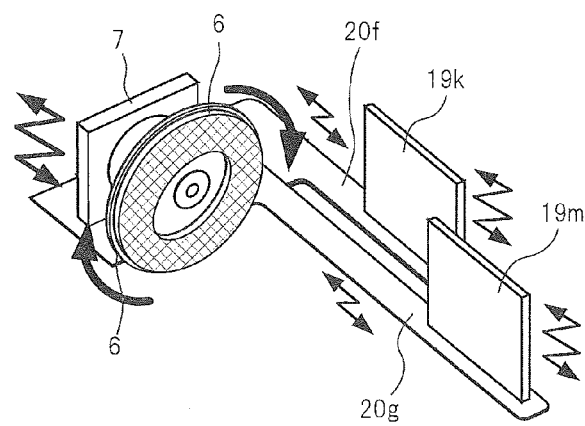
FIG. 11B is a perspective view showing a structure where a wheel motor and a diffusion plate are interconnected via a plate spring in a light source device included in the projection-type display device according to the sixth embodiment.
Figure 11C:
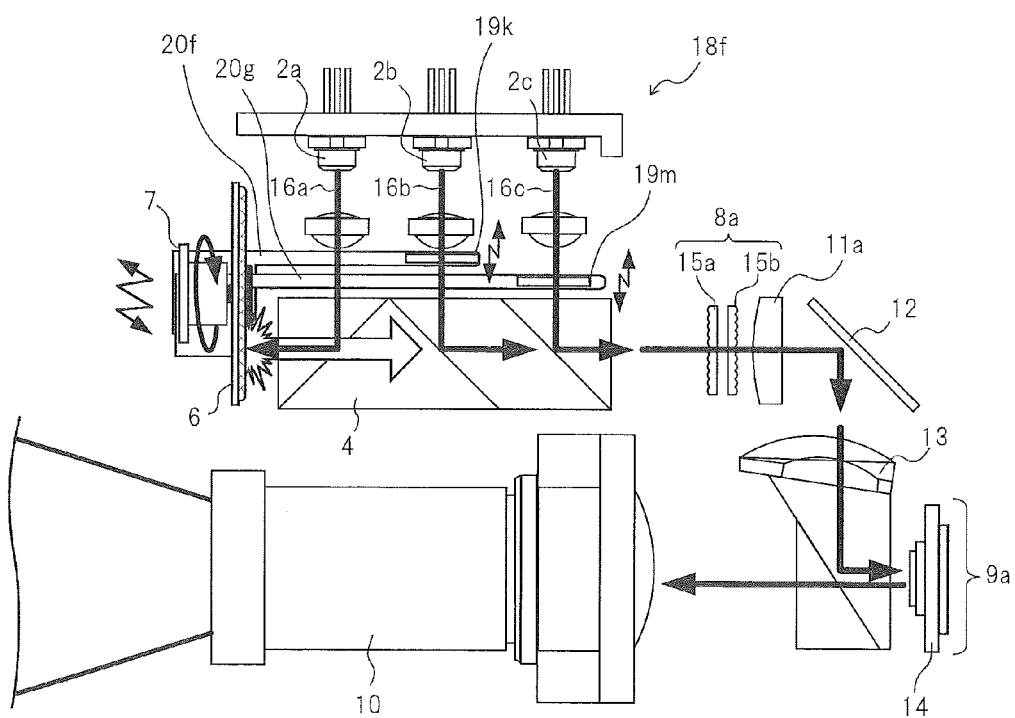
FIG. 11C is a plan view showing the projection-type display device according to the sixth embodiment.

FIG. 11A is a perspective view schematically showing the projection-type display device according to the sixth embodiment. FIG. 11B is a perspective view showing a structure where a wheel motor and a diffusion plate are interconnected via a plate spring in the projection-type display device according to the sixth embodiment. FIG. 11C is a plan view showing the projection-type display device according to the sixth embodiment.

As shown in FIGS. 11B and 11C, light source device 18f included in the projection-type display device according to the sixth embodiment includes first and second diffusion plates 19k and 19m respectively corresponding to the optical paths of laser light sources 2b and 2c that are light sources for other than excitation of fluorescent body 5, and first and second plate springs for individually connecting first and second diffusion plates 19k and 19m to wheel motor 7.

First diffusion plate 19k is disposed between collimator lens 3b and the incident end side of dichroic prism 4 on the optical path of laser light source 2b. Second diffusion plate 19m is disposed between collimator lens 3c and the incident end side of dichroic prism 4 on the optical path of laser light source 2c.

In the sixth embodiment, as in the aforementioned case, first diffusion plate 19k is connected to wheel motor 7 via first plate spring 20f. Second diffusion plate 19m is connected to wheel motor 7 via second plate spring 20g.

In the sixth embodiment, the solid propagation frequency of wheel motor 7 matches the resonance frequency of first plate spring 20f, or second plate spring 20g, or both first plate spring 20f and second plate spring 20g; and first diffusion plates 19k, or second diffusion plate 19m, or both first diffusion plates 19k and second diffusion plate 19m, is/are effectively vibrated. According to the embodiment, the inclusion of first and second plate springs 20f and 20g for individually connecting first and second diffusion plates 19k and 19m to wheel motor 7 enables efficient vibration of first and second diffusion plates 19k and 19m.

In addition, according to the embodiment, even when it is difficult to match the resonance frequency of the plate spring with the frequency of vibration waves of wheel motor 7, that are transmitted through a solid substance, the resonance frequency of first plate spring 20f, or second plate spring 20g, or both first plate spring 20f and second plate spring 20g, can be matched with the frequency of vibration waves of wheel motor 7, that are transmitted through a solid substance. Thus, according to the sixth embodiment, the freedom of plate spring designing can be increased and as in the aforementioned embodiments, the effect of reducing speckle noise can be obtained. According to the sixth embodiment, as in the aforementioned embodiments, a mechanism for reducing speckle noise can be miniaturized, manufacturing costs can be reduced, and power consumption and noise can be reduced.

In the aforementioned embodiment, optical integrator 8a is not limited to fly-eye lenses 15a and 15b. A rod-type integrator or a light tunnel can be used. The optical member is not limited to dichroic prism 4. A dichroic mirror or a cross dichroic prism can be used. Spatial light modulation device 9a is not limited to DMD 14. A reflective liquid crystal display panel or a transmissive liquid crystal panel can be used.

The aforementioned embodiment is applied to the configuration including three laser light sources 2a to 2c. The embodiment is not limited to this configuration but can be applied to, for example, a configuration including one laser light source for emitting blue light. In the case of this configuration, red fluorescent light, green fluorescent light, and a blue laser beam can be generated in time division by rotating a circular substrate where a first region having a fluorescent body for emitting red light, a second region having a fluorescent body for emitting green light, and a third region for transmitting a blue laser beam are arranged in a divided manner.

REFERENCE NUMERALS 2a to 2c Laser light source
4 Dichroic prism
5 Fluorescent body
6 Circular substrate
7 Wheel motor
8a Optical integrator
9a Spatial light modulation device
16a to 16c Laser beam
17 Fluorescent light
18a to 18e Light source device
19a to 19k, 19m Diffusion plate
20a to 20g Plate spring

The invention claimed is:
1. A light source device comprising:
a laser light source;
a fluorescent plate which has a fluorescent body that emits light by using light from the laser light source as excitation light;
a motor which rotates the fluorescent plate;

an optical member which transmits the light from the fluorescent body while reflecting the light from the laser light source;
a diffusion plate which diffuses the light from the laser light source; and
an elastic member which interconnects the diffusion plate and the motor,
wherein frequency of vibration waves of the motor, that are transmitted through a solid substance, matches a resonance frequency of the elastic member.

2. The light source device according to claim 1, wherein the fluorescent plate has a rotation axis of the motor fixed at a position deviated from a center of the fluorescent plate.

3. The light source device according to claim 1, wherein the diffusion plate is disposed on an optical path from an exit end of the optical member.

4. The light source device according to claim 1, wherein:
the laser light source includes a first laser light source for emitting light to excite the fluorescent body, and a second laser light source for emitting light output from the optical member without illuminating the fluorescent body; and
the diffusion plate is disposed on an optical path from the second laser light source between the optical member and the second laser light source.

5. The light source device according to claim 3, wherein the fluorescent plate is formed by mixing the fluorescent body and a base material.

6. The light source device according to claim 5, further comprising a blower which has a fan motor that rotates a fan, wherein the motor is the fan motor.

7. The light source device according to claim 6, wherein the blower blows air from the fan to the laser light source.

8. The light source device according to claim 6, wherein the blower discharges air out of a case of a projection-type display device.

9. A projection-type display device comprising:
the light source device according to claim 1; and
a light modulation device which modulates light from the light source device.

10. A light source device comprising:
a laser light source;
a fluorescent plate which has a fluorescent body that emits light by using light from the laser light source as excitation light;
a motor which rotates the fluorescent plate;
an optical member which transmits the light from the fluorescent body while reflecting the light from the laser light source;
a diffusion plate which diffuses the light from the laser light source; and
an elastic member which interconnects the diffusion plate and the motor; wherein:
the elastic member is extended in a belt shape from the motor to the diffusion plate; and
the motor is disposed at one end in the extending direction of the elastic member while the diffusion plate is disposed at the other end in the extending direction of the elastic member.

11. A light source device comprising:
a laser light source;
a fluorescent plate which has a fluorescent body that emits light by using light from the laser light source as excitation light;
a motor which rotates the fluorescent plate;
an optical member which transmits the light from the fluorescent body while reflecting the light from the laser light source;
a diffusion plate which diffuses the light from the laser light source; and
an elastic member which interconnects the diffusion plate and the motor, wherein:
the laser light source includes a first laser light source for emitting light to excite the fluorescent body, and a second laser light source for emitting light output from the optical member without illuminating the fluorescent body; and
the diffusion plate is disposed on an optical path from the second laser light source between the optical member and the second laser light source;
the laser light source further includes a third laser light source for emitting the light output from the optical member without illuminating the fluorescent body;
the diffusion plate includes a first diffusion plate disposed on the optical path which begins from the second laser light source and which is located between the optical member and the second laser light source, and a second diffusion plate disposed on an optical path which begins from the third laser light source and which is located between the optical member and the third laser light source; and
the first and second diffusion plates are connected to individual elastic members, and each of the plurality of elastic members is connected to the motor.

12. The light source device according to claim 11, wherein frequency of vibration waves of the motor, that are transmitted through a solid substance, matches a resonance frequency of at least one of the plurality of elastic members.

* * * * *